Jan. 26, 1954

K. A. LANG 2,667,616

CURRENT CONTROL APPARATUS

Filed April 29, 1950

INVENTOR:
Karl A. Lang,
BY Dawson, Ooms, Booth and Spangenberg,
ATTORNEYS.

Patented Jan. 26, 1954

2,667,616

UNITED STATES PATENT OFFICE 2,667,616

CURRENT CONTROL APPARATUS

Karl A. Lang, Glenview, Ill., assignor to Lindberg Engineering Company, Chicago, Ill., a company of Illinois Application April 29, 1950, Serial No. 159,046

11 Claims. (Cl. 323—2)

This invention relates to current control apparatus and more particularly to a resonant constant potential to constant current circuit in which provisions are made to compensate for the effect of source voltage changes.

Resonant type current regulators employing a monocyclic square or a similar resonant circuit have been employed extensively, and it is known that they produce an increase in the load current in response to an increase in source voltage. Various methods of compensating for this characteristic of the circuits have been employed, including those more particularly described and claimed in my Patents Nos. 2,426,937 and 2,471,822. In these circuits the effect of the capacitators is varied in response to supply voltage changes to maintain the load current constant. The present invention provides different means for accomplishing this result which produces additional advantages for certain types of operation.

It is one of the objects of the present invention to provide a current regulating apparatus in which the inductive elements in the resonant circuit are varied in response to changes in the supply voltage. The control is such that the inductive effect varies inversely to the supply voltage to provide proper voltage compensation.

Another object is to provide a current control apparatus in which saturation of a core on which the inductive windings are mounted is varied in response to supply voltage changes to compensate for such changes. Preferably the core carries two saturating windings, the current through which is varied in a different manner in response to source voltage changes so that saturation of the core varies inversely to the voltage changes.

Still another object is to provide a current regulating apparatus in which both the capacitative and inductive elements in the resonant circuit are varied simultaneously in response to voltage changes. With this arrangement the circuit is maintained at resonance, or substantially at resonance, under all operating conditions.

A further object is to provide a current control apparatus in which the capacitative elements are connected across windings mounted on a core and the inductive elements are formed by windings mounted on a core and saturation of both cores is simultaneously controlled in response to source voltage changes.

Figure 1:
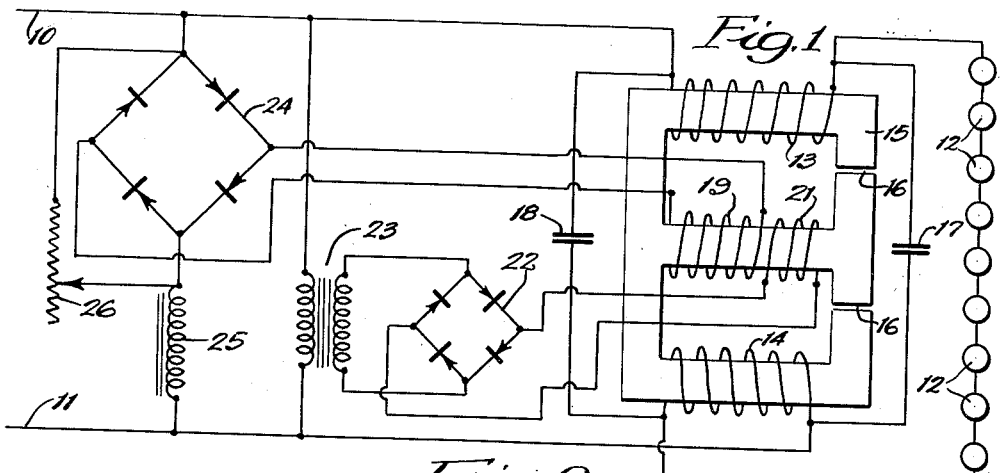
Figure 2:
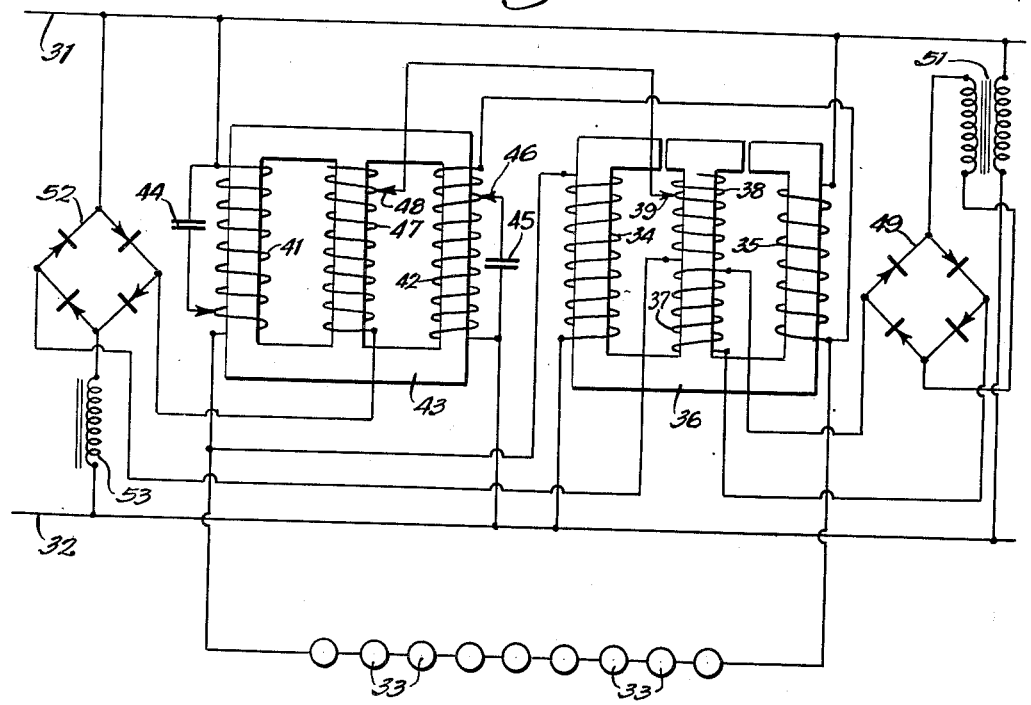

The above and other objects and advantages of the invention will be more readily apparent from the following description when read in connection with the accompanying drawing in which:

Figure 1 is a circuit diagram of one form of current control apparatus embodying the invention and Figure 2 is a circuit diagram of an alternative control apparatus.

Referring first to Figure 1, the circuit illustrated therein comprises a monocyclic square connecting a source to a load to provide constant current to the load. As illustrated, the source includes wires 10 and 11 which may lead from any convenient generator of alternating current and the load is shown as a series of electric lamps 12 connected in series circuit. The monocyclic square includes a pair of inductive windings 13 and 14 wound on a magnetic core 15 which is preferably provided with air gaps 16. Condensers 17 and 18 are connected with the windings 13 and 14 in a monocyclic square circuit. The supply leads 10 and 11 are connected to opposite corners of the square as shown, and the load circuit is connected across the remaining corners.

With this type of circuit the load current will vary in response to changes in the source voltage. To compensate for this effect, the core 15 is provided with a center leg carrying a pair of saturating windings 19 and 21. The winding 21 forms a biasing winding whose effect is normally greater than that of the winding 19. As shown, the winding 21 is supplied with saturating current from a full wave rectifier 22 supplied from a transformer 23 whose primary winding is connected directly across the source 10, 11. With this type of connection the saturating current in the winding 21 will vary substantially linearly with voltage changes in the supply source.

The winding 19 opposes the winding 21 and is supplied from the source through a circuit arranged to provide an amplifying or non-linear current effect. This circuit, as illustrated, is similar to that disclosed in my Patent No. 2,471,822 and comprises a full wave rectifier 24 connected across the supply source 10, 11 in series with a saturable reactor 25. The rectifier may be shunted by a variable resistor 26 which can be adjusted to control the saturating current and which functions to limit the saturating current. Normally the current through the winding 19 is so related to that through the winding 21 that the effect of the winding 19 is less than and is in opposition to that of the winding 21.

In operation, assuming an increase in voltage in the source, the current through the winding 21 will increase linearly with respect to the voltage change. At the same time the current through the winding 19 will increase at an amplified rate relative to the voltage change so that the resultant saturating current in the core 15 will be decreased. This will increase the inductive effect of the windings 13 and 14, thereby decreasing the load current. It will be seen that by proper design of the circuit components the load current can accurately be regulated so that it is maintained at a constant value regardless of source voltage fluctuations.

Figure 2 illustrates a similar circuit in which both the inductive and capacitative elements are controlled. As shown, the apparatus is supplied from a source including leads 31 and 32 and supplies a load again indicated as a plurality of electric lamps 33 connected in series. The circuit includes a pair of inductive windings 34 and 35 mounted on a core 36. The core 36 carries a central leg on which saturating windings 37 and 38 are wound. One of the connections to the winding 38 may include a movable wiper 39, as illustrated, so that the effective number of turns in this winding can be adjusted.

The capacitative elements of the circuit include a pair of windings 41 and 42 wound on a core 43 and inductively coupled through the core. Condensers 44 and 45 are connected across the windings 41 and 42, respectively, and may include adjustable wipers 46 by which the number of turns across which the condensers are connected can be adjusted. This part of the circuit is substantially similar to that more particularly disclosed and claimed in my Patents 2,405,837 and 2,426,937.

The core 43 carries a central saturating leg on which a saturating winding 47 is wound. An adjustable wiper 48 may engage this winding so that the effective number of turns therein can be adjusted.

The winding 37 on the core 36 corresponds to the winding 21 of Figure 1 and is supplied from a full wave rectifier 49 connected across the lines 31 and 32 through a transformer 51. Thus the current in the winding 37 will vary substantially linearly in response to source voltage changes.

The saturating windings 38 and 47 are supplied with saturating current at an amplified rate in response to source voltage changes. As shown, the saturating current is suppled by a rectifier 52 connected across the source in series with a saturable reactor 53. One side of the rectifier is connected to one end of the winding 47 and the other side is connected to one end of the winding 38 and the two wipers 39 and 48 are interconnected so that the windings 38 and 47 are in series. This type of connection insures equal saturating currents in both windings, although parallel connections could be used if desired.

In the operation of this circuit the inductive effect is changed in response to source voltage changes in the same manner as described in Figure 1. At the same time the core 43 is variably saturated to change the effect of the capacitator elements. By proper design of the components, the inductive and capacitative functions can be made to change such amounts that the output movement will be held constant and the circuit will be maintained in resonance to provide a unity, or near unity, power factor under all operating conditions.

While two embodiments of the invention have been shown and described in detail, it will be understood that these are illustrative only and not to be taken as a definition of the scope of the invention, reference being had for this purpose to the appended claims.

What is claimed is:

1. Current regulating apparatus comprising a pair of inductive windings and a pair of capacitors connected in a monocyclic square opposite corners of which are adapted to be connected to an alternating current source and the remaining corners to a load, a core on which the inductive windings are wound, a saturating winding on the core, and means connecting the saturating winding to the source to supply variable saturating current thereto in response to the source voltage.

2. Current regulating apparatus comprising a pair of inductive windings and a pair of capacitors connected in a monocyclic square opposite corners of which are adapted to be connected to an alternating current source and the remaining corners to a load, a core on which the inductive windings are wound, saturating windings on the core, and means separately connecting the saturating windings to the source to supply variable saturating current to the windings in response to the source voltage to vary saturation of the core inversely to changes in the source voltage.

3. Current regulating apparatus comprising a pair of inductive windings and a pair of capacitors connected in a monocyclic square opposite corners of which are adapted to be connected to an alternating current source and the remaining corners to a load, a core on which the inductive windings are wound, a pair of saturating windings on the core, and means separately connecting the saturating windings to the source to supply variable saturating current thereto in response to the source voltage, said means having different voltage response characteristics and being connected to the saturating windings in opposition to each other to produce a resultant change in saturating current inverse to voltage changes in the source.

4. Current regulating apparatus comprising a pair of inductive windings and a pair of capacitors connected in a monocyclic square opposite corners of which are adapted to be connected to an alternating current source and the remaining corners to a load, a core on which the inductive windings are wound, a pair of saturating windings on the core, a rectifier connecting one of the windings to the source to produce a substantially linear change in the saturating current therein in response to the source voltage, a circuit including a rectifier connecting the other saturating winding to the source in opposition to said one of the windings, and amplifying means in the circuit to produce a non-linear response to changes in the source voltage.

5. Current regulating apparatus comprising a pair of inductive windings and a pair of capacitors connected in a monocyclic square opposite corners of which are adapted to be connected to an alternating current source and the remaining corners to a load, a core on which the inductive windings are wound, a pair of saturating windings on the core, a rectifier connecting one of the windings to the source to produce a substantially linear change in the saturating current therein in response to the source voltage, a circuit including a rectifier connecting the other saturating winding to the source in opposition to said one of the windings, and a saturable reactor in the circuit to produce a non-linear response to changes in the source voltage.

6. Current control apparatus comprising a pair of inductively coupled windings wound on a core, a capacitor connected across at least one of the windings, a pair of inductive windings wound on a second core and connected to the coupled windings in a monocyclic square, opposite corners of which are adapted to be connected to an alternating current source and the remaining corners to a load, saturating windings on the cores, and means connecting the saturating windings to the source to vary the saturating current therein in response to the source voltage.

7. Current control apparatus comprising a pair of inductively coupled windings wound on a core, a capacitor connected across at least one of the windings, a pair of inductive windings wound on a second core and connected to the coupled windings in a monocyclic square, opposite corners of which are adapted to be connected to an alternating current source and the remaining corners to a load, saturating windings on the cores, and means connecting the saturating windings to the source and effective to vary the saturating current therein opposite directions in response to changes in the source voltage.

8. Current control apparatus comprising a pair of inductively coupled windings wound on a core, a capacitor connected across at least one of the windings, a pair of inductive windings wound on a second core and connected to the coupled windings in a monocyclic square, opposite corners of which are adapted to be connected to an alternating current source and the remaining corners to a load, a saturating winding on the first core, a pair of saturating windings on the second core, a rectifier connecting one of the pair of saturating windings to the source, a circuit including a rectifier connecting the other two saturating windings to the source, and means in the circuit to produce a non-linear response to changes in the source voltage.

9. Current control apparatus comprising a pair of inductively coupled windings wound on a core, a capacitor connected across at least one of the windings, a pair of inductive windings wound on a second core and connected to the coupled windings in a monocyclic square, opposite corners of which are adapted to be connected to an alternating current source and the remaining corners to a load, a saturating winding on the first core, a pair of saturating windings on the second core, a rectifier connecting one of the pair of saturating windings to the source, a circuit including a rectifier connecting the other two saturating windings to the source, and a saturable reactor in the circuit to produce a non-linear response to changes in the source voltage.

10. Current regulating apparatus comprising a pair of inductive elements and a pair of capacitor elements connected in a monocyclic square adapted to have opposite corners connected to an alternating current source and the remaining corners to a load, means to vary the inductive effect of the inductive elements, and control means responsive to the source voltage to control the last named means to produce changes in the inductive effect inverse to source voltage changes.

11. Current regulating apparatus comprising a pair of inductive elements and a pair of capacitor elements connected in a monocyclic square adapted to have opposite corners connected to an alternating current source and the remaining corners to a load, means to vary the inductive effect of the inductive elements, means to vary the capacity effect of the capacitor elements, and control means responsive to changes in the source voltage to produce changes in both of said effects inverse to source voltage changes.

KARL A. LANG.

References Cited in the file of this patent

UNITED STATES PATENTS

| Number | Name | Date |
|---|---|---|
| 2,069,825 | Farkas et al. | Feb. 9, 1937 |
| 2,399,185 | Hedding | Apr. 30, 1946 |
| 2,421,786 | Haug | June 10, 1947 |
| 2,471,822 | Lang | May 31, 1949 |